United States Patent [19]

Meckler

[11] 4,222,244

[45] * Sep. 16, 1980

[54] AIR CONDITIONING APPARATUS UTILIZING SOLAR ENERGY AND METHOD

[75] Inventor: Gershon Meckler, Bethesda, Md.

[73] Assignee: Gershon Meckler Associates, P.C., Washington, D.C.

[*] Notice: The portion of the term of this patent subsequent to Mar. 15, 1994, has been disclaimed.

[21] Appl. No.: 958,485

[22] Filed: Nov. 7, 1978

Related U.S. Application Data

[63] Continuation of Ser. No. 777,049, Mar. 14, 1977, abandoned.

[51] Int. Cl.² .................... F25B 27/00; F25D 23/00
[52] U.S. Cl. ........................................... 62/2; 62/271
[58] Field of Search .................... 62/2, 271; 126/270, 126/271

[56] References Cited

U.S. PATENT DOCUMENTS

| | | | |
|---|---|---|---|
| 2,030,350 | 2/1936 | Bremser | 62/2 |
| 2,221,971 | 11/1940 | Haywood | 62/2 |
| 2,257,485 | 9/1941 | Sewell | 62/271 |
| 2,557,204 | 6/1951 | Richardson | 62/271 |
| 2,693,939 | 11/1954 | Marchant | 62/2 |
| 3,247,679 | 4/1966 | Meckler | 62/271 |
| 3,417,574 | 12/1968 | Kelley | 62/271 |
| 3,488,971 | 1/1970 | Meckler | 62/271 |
| 4,011,731 | 3/1977 | Meckler | 126/271 |

OTHER PUBLICATIONS

"Cooling with Solar Energy" by George O. G. Lof, pp. 171-189, Proceedings of World Symposium on Applied Solar Energy at Phoenix, Ariz. on Nov. 1-Nov. 5, 1956, published and distributed by Stanford Research Institute, Menlo Park, Calif. copyright 1956 by the Assn. for Applied Solar Energy.

Primary Examiner—Lloyd L. King
Attorney, Agent, or Firm—John C. Purdue

[57] ABSTRACT

An air conditioning apparatus and method are disclosed. The apparatus includes a chemical dehumidifier which employs an aqueous hygroscopic solution of glycol and a solar energy collector for use in regenerating the solution. Air to be conditioned is circulated through a contactor of the chemical dehumidifier, in contact with cooled glycol solution. Concentrated hygroscopic glycol solution is circulated from a regenerator to the contactor, while dilute solution is circulated from the contactor to the regenerator. Energy from the solar collector is transferred to facilitate concentration thereof. In one disclosed embodiment energy from the solar collector is also transferred to the generator of heat-powered refrigeration apparatus, e.g., absorption or rankine engine driven refrigeration apparatus. The condenser of the refrigeration apparatus may operate to heat the glycol solution in the regenerator of the dehumidifier and the evaporator may cool the concentrated glycol solution in the contactor and/or may supply chilled fluid to a heat exchanger for cooling the dehumidified air. In a modified embodiment, a diesel engine drives the refrigeration apparatus. Waste heat from the diesel engine either augments the solar energy for regenerating the glycol solution or regenerates desiccant from a second stage of dehumidification.

17 Claims, 7 Drawing Figures

AIR CONDITIONING APPARATUS UTILIZING SOLAR ENERGY AND METHOD

This is a continuation of application Ser. No. 777,049 filed Mar. 14, 1977, now abandoned.

This invention relates to air conditioning and more particularly to a method and apparatus for controlling the humidity and the temperature of air through the use of solar energy.

The desirability of utilizing solar energy has been recognized. Solar energy collectors have been produced from sheets of aluminum laminated one to another, each sheet having a raised portion extending from end-to-end thereof, and matching a raised portion on the other sheet, so that the laminate has a channel extending from end-to-end through which a heat transfer fluid, usually water, can be circulated. Such a collector can be positioned so that solar radiation is intercepted by a major surface thereof, and a heat transfer fluid can be circulated through the collector channel to be heated by the intercepted solar energy. The temperature to which the heat transfer fluid is heated can be varied, within limits, by controlling the rate at which it is circulated through the collector. However, the temperature to which the heat transfer fluid is heated varies as an inverse function of the flow rate, and, it has been found, the amount of energy available from any given collector also varies as an inverse function of the discharge temperature of the heat transfer fluid. For example, slightly less than 70 percent as much energy is available from a given collector when the discharge temperature of the heat transfer fluid having a relatively low flow rate is 200° F. as when the discharge temperature of the fluid at a higher flow rate is 140° F., other factors being equal.

The use of energy from a solar collector in absorption refrigeration apparatus has been suggested. It has been found that available absorption refrigeration apparatus can be operated on energy from a solar collector, provided that the collector is operated to provide a heat transfer fluid at a temperature of at least about 200° F., but that the absorption refrigeration apparatus will have approximately 50 percent of the capacity for which it was designed. It will be appreciated, therefore, that there is a need for more efficient ways to utilize energy from solar collectors.

According to the present invention, apparatus is provided for conditioning air through a more efficient use of solar energy than that found in the prior art. Either a mixture of fresh air and return air or fresh air only is dehumidified by passing the air through a contactor where it comes in contact with a hygroscopic solution of a glycol. In the latter case the dehumidified fresh air only is mixed with the return air. In either case the resultant mixture is further chilled to the extent necessary and it is delivered to a closed air conditioned space. Dehumidification of the outside air component considerably reduces the energy requirements for cooling the mixed air to a desired temperature level.

Solar energy absorbed by a solar collector is transferred into a heat storage tank by means of a liquid and is used for regenerating the hygroscopic solution used in the contactor. Dilute hygroscopic solution from the contactor is circulated to a regenerator where it is concentrated and the concentrated solution is returned to the contactor. At least some of the dilute hygroscopic solution circulated to the regenerator is also circulated through a heat exchange coil in a storage tank containing a liquid heated with solar energy to maintain a desired temperature of the hygroscopic solution during regeneration, e.g., 130° F. to 150° F. for a glycol solution.

Energy stored in the tank may also be used for energizing absorption refrigeration apparatus which includes a generator, a condenser and an evaporator. The energy is used to heat refrigerant in the generator. The condenser may be connected, in place of the heat exchange coil in the solar energy storage tank, to heat the hygroscopic solution which is being concentrated in the regenerator. Either the evaporator or an evaporative cooler may be used for cooling the concentrated hygroscopic solution circulated through the contactor during dehumidification to increase the efficiency of dehumidification in the contactor and to lower the temperature of the dehumidified air leaving the contactor. In addition, either the evaporative cooler or the evaporator of the absorption refrigeration apparatus may be operatively connected to a heat exchanger for cooling dehumidified fresh air or a mixture of the dehumidified fresh air and return air. Since the moisture content of the air has been greatly reduced by the dehumidifier, the energy required to cool the air to a desired level also will be reduced significantly.

It is an object of the invention to provide air conditioning apparatus which uses solar energy as an energy source of regenerating a hygroscopic solution of a glycol used to dehumidify air.

Another object of the invention is to provide air conditioning apparatus in which solar energy is used both for operating absorption refrigeration apparatus and for regenerating a hygroscopic solution of a glycol used in a dehumidifier.

Still another object of the invention is to provide air conditioning apparatus in which solar energy is used both for operating refrigeration apparatus driven by a rankine cycle engine and for regenerating a hygroscopic solution of a glycol used in a dehumidifier.

Other objects and advantages of the invention will become apparent from the following detailed description with reference being made to the accompanying drawings.

Figure 1:
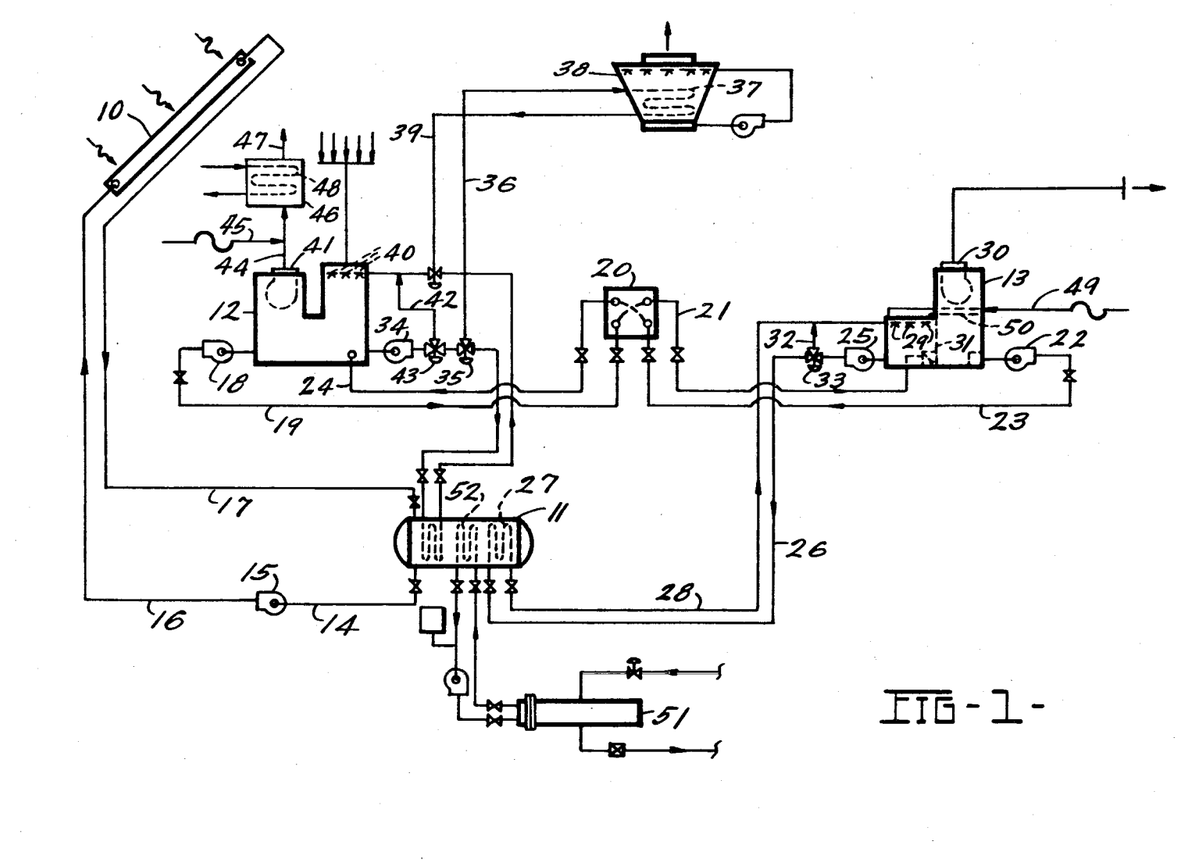
FIG. 1 is a partially schematic diagram of air conditioning apparatus according to the invention, and including a solar collector, an energy storage tank, and a chemical dehumidifier.

Referring to FIG. 1 of the drawings, air conditioning apparatus according to the invention is shown as comprising a solar collector 10, a heated water storage tank 11, and dehumidification apparatus including a contactor 12 and a regenerator 13. A heat transfer fluid, usually treated water, is circulated from the tank 11 through a line 14 to a pump 15, and from thence through a line 16 to the solar collector 10. Heated fluid returns from the collector 10 through a line 17 to the tank 11. The pump 15 is controlled to maintain a predetermined fluid temperature, say, 140° F., within the tank 11.

As will be discussed in greater detail below, fresh air is dehumidified by drawing the air through a spray of an aqueous hygroscopic solution of a glycol in the contactor 12. The hygroscopic solution is recirculated through the contactor 12 from a collection reservoir located at the bottom of the contactor 12. A portion of the solution in the reservoir is also circulated through the regenerator 13 where it is concentrated by evaporating water from the solution. Concentrated solution is returned from the regenerator 13 to the contactor 12.

The aqueous hygroscopic solution is circulated by a pump 18 through a line 19, an indirect heat exchanger 20 and a line 21 to the regenerator 13. The concentrated solution is then returned by a pump 22 through a line 23, the indirect heat exchanger 20, and a line 24 back into a reservoir in the contactor 12. The glycol solution is also circulated by a pump 25 from the regenerator 13 through a line 26 to a heat exchange coil 27 positioned within the tank 11 where the solution is heated, and thence through a line 28 to spray nozzles 29 within the regenerator 13. Preheated air, as subsequently explained, enters the regenerator 13 at the upper left, travels downwardly with the heated glycol solution sprayed from the nozzles 29, past a baffle 31, and then upwardly through the blower 30 to be discharged from the system along with water evaporated from the heated glycol solution. The regenerator 13 can be controlled conveniently by utilizing a by-pass 32, under the control of a valve 33 to maintain the temperature of the glycol solution leaving the nozzles 29 at a predetermined control level. Hygroscopic glycol solutions are available, for example, for which a predetermined controlled temperature on the order of 120° F. to 130° F. is sufficient to evaporate the water from the solution.

The hygroscopic glycol solution is also circulated from the reservoir in the contactor 12 by a pump 34 through a three-way valve 35 and a line 36 to a coil 37 of an evaporative cooler or cooling tower 38. The cooling tower 38 transfers to a heat sink, the atmosphere, heat of sorption from the dehumidification process. "Heat of sorption" may be defined as a change from latent heat to sensible heat including the latent heat of condensation of water vapor and any heat of solution resulting from the mixing of the water removed from the dehumidified air with the glycol solution, or other hygroscopic material. The cooled glycol solution from the coil 37 flows through a line 39 and is sprayed from nozzles 40 within the contactor 12. Fresh air is drawn into the contactor 12 by a blower 41, is dehumidified and, usually, cooled sensibly, by contact with the glycol solution sprayed from the nozzles 40. The contactor 12 can be controlled by using a by-pass 42, under the control of a valve 43 to maintain a predetermined dry bulb temperature at the inlet to the blower 41.

It will be apparent from the above description that the contactor 12 requires a cooled glycol solution while the regenerator 13 requires a heated solution. The warm concentrated solution pumped from the regenerator 13 to the contactor 12 is therefore passed through the heat exchanger 20 where some of the unwanted heat in the concentrated solution is transferred to the cool dilute solution being pumped from the contactor 12 to the regenerator 13. Thus, the heat exchanger 20 increases the efficiency of the dehumidification apparatus.

Conditioned air leaves the contactor 12 in a duct 44 where it is mixed with return air in a duct 45 of a conventional air distribution system (not illustrated). The mixture of dehumidified fresh air and return air flows from the duct 44 through an indirect heat exchanger 46 and into a duct 47, from which it is delivered to the air distribution system. Or, the duct 45 may be connected to mix the return and fresh air prior to dehumidification in the contactor 12. In the indirect heat exchanger 46 the mixture of dehumidified fresh air and return air is cooled sensibly by contact with an indirect heat exchange coil 48 through which chilled water from a conventional source (not illustrated) is circulated as required to maintain a desired dry bulb temperature in the duct 47.

As previously indicated, the air entering the left side of the regenerator 13 is pre-heated. This can be accomplished by delivering the regenerating air, preferably relief air from the building being conditioned, through a line 49 to an indirect air-to-air heat exchanger 50. Hot, saturated air within the regenerator 13 flows through the opposite side of the indirect heat exchanger 50 before entering the blower 30 for discharge from the regenerator 13. In a practical situation, building exhaust air in the line 49 may have a dry bulb temperature of about 83° F. and a dew point of about 56° F., while air entering the heat exchanger 50 from the regenerator 13 may be saturated at 120° F. Under these conditions, sufficient heat transfer is possible in the indirect heat exchanger 50 that the ultimate exhaust air can leave the blower 30 at a dry bulb temperature of 96° F. and a dew point of 79° F.; this heat transfer reduces significantly the energy required for regeneration of the hygroscopic glycol solution.

Figure 2:
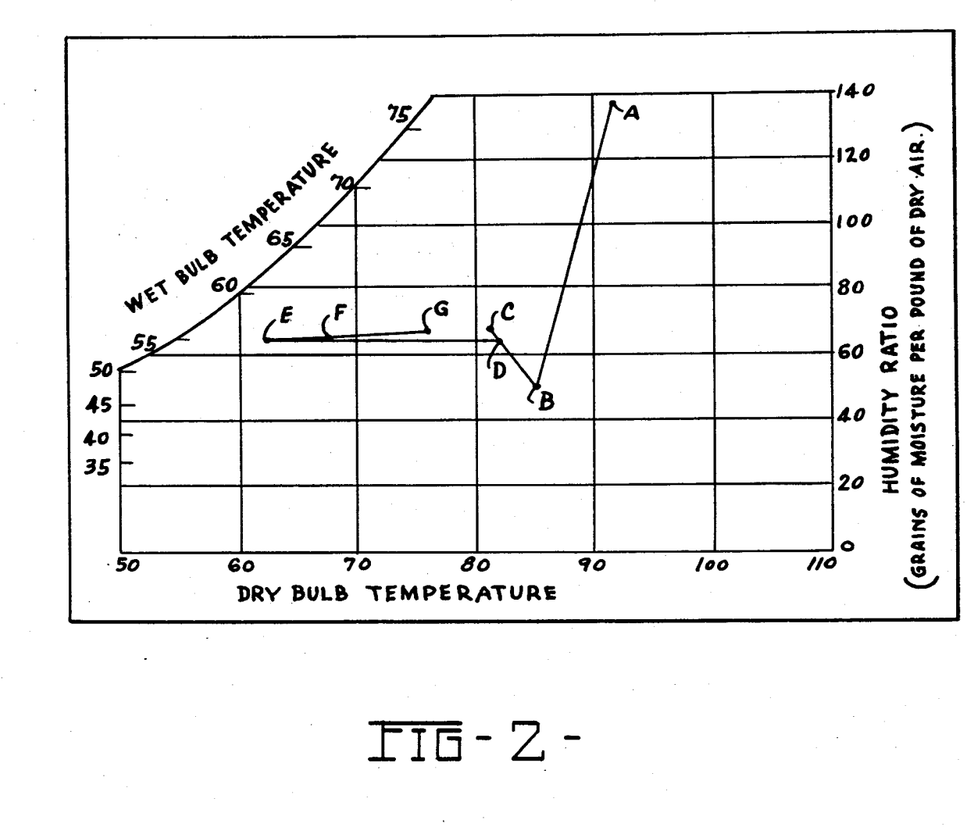
FIG. 2 is a psychometric chart illustrating one way of operating the apparatus of FIG. 1.

Referring to FIG. 2 of the drawings, the psychometric chart illustrates a preferred mode of operating the apparatus of FIG. 1. Outside air entering the contactor 12 having a dry bulb temperature of 92° F. and a wet bulb temperature of 76° F., point A, is dehumidified and cooled, and then enters the duct 44 at a dry bulb temperature of 85° F. and a wet bulb temperature of 48° F., point B, and is mixed with 6½ times its weight of return air having a dry bulb temperature of 81° F. and a wet bulb temperature of 56° F., point C. The mixture has a dry bulb temperature of 82° F. and a wet bulb temperature of 55° F., point D. The mixture can be cooled sensibly in the indirect heat exchanger 46 to a dry bulb temperature of 63° F. without changing its wet bulb temperature, point E, and will be heated to a dry bulb temperature of about 67° F., point F, in the building distribution system (not illustrated), so that it can be used as required to maintain a control condition: dry bulb temperature 76° F. and wet bulb temperature 56°

F., point G. It has been found that the apparatus of FIG. 1, when operated as just described, requires about 3.2 tons of refrigeration for the indirect heat exchanger 46 and 1 ton of refrigeration for the chemical dehumidifier to condition a given number of pounds of air per hour as described. If, for purposes of comparison, but not in accordance with the instant invention, air is conditioned at the same given rate, but by mixing outside air and return air, and cooling and dehumidifying this mixture by means of a chilled, indirect heat exchange coil, it is found that: (1) the mixture has to be chilled to a dry bulb temperature of about 58° F. to achieve the required dehumidification; (2) the mixture, after dehumidification must be reheated to about 67° F.; and (3) the energy requirement, for cooling, dehumidifying and reheating, is equivalent to about 4.8 tons of refrigeration.

In some instances, the solar collector 10 will collect insufficient heat for regenerating the hygroscopic glycol solution. For example, on certain hot, humid days, heavy cloud cover may limit the solar energy intercepted by the collector 10. Additional energy will also be required if the apparatus is operated at night. A steam or other heat source 51 may be connected to a coil 52 located to heat water in the storage tank 11 during such conditions. In many cities, large office buildings are heated during cold weather with steam purchased from a utility company such as an electric company. The steam, which may be a by-product from the utility company, is also available in the summer and may be used when necessary for heating water in the tank 11 to provide sufficient energy for operating the regenerator 13.

Figure 3:
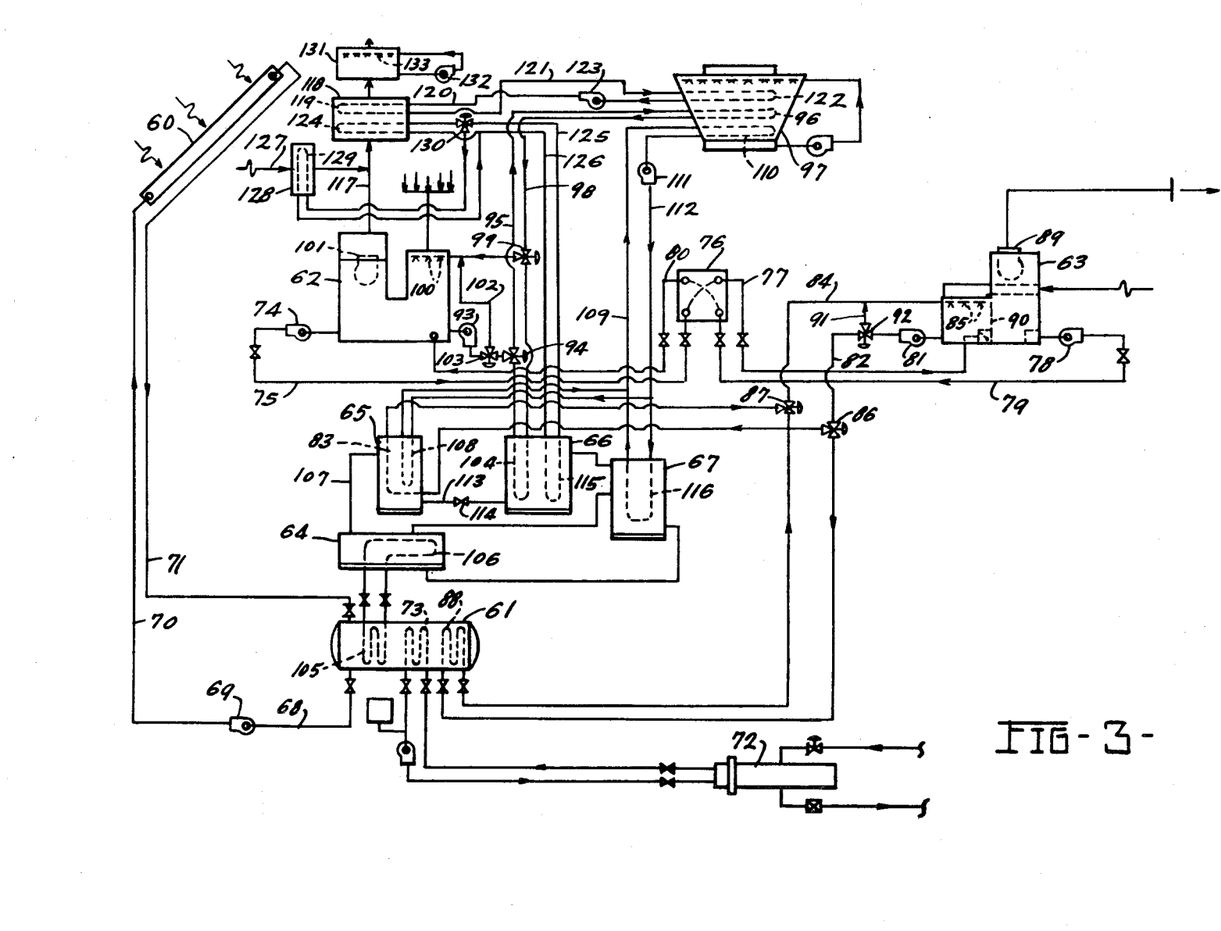
FIG. 3 is a partially schematic diagram of air conditioning apparatus according to the invention, and including a solar collector, an energy storage tank, a chemical dehumidifier and absorption refrigeration apparatus.

Referring, now to FIG. 3, air conditioning apparatus is shown according to a second embodiment of the invention. The apparatus generally comprises a collector 60 for solar energy, a storage tank 61 for heated heat transfer fluid, dehumidification apparatus including a contactor 62 and a regenerator 63, and absorption refrigeration apparatus shown schematically as including a generator 64, a condenser 65, an evaporator 66 and an absorber and heat exchanger 67. A heat transfer fluid, usually treated water, is circulated from the tank 61 through a line 68 by a pump 69, and thence through a line 70 to the solar collector 60. Heated fluid returns from the collector 60 through a line 71 to the tank 61. The pump 69 is controlled to maintain a predetermined fluid temperature, for example, 200° F., within the tank 61. In the event that energy intercepted by the solar collector is insufficient to heat the fluid in the tank 61 to the predetermined temperature, the fluid may be heated from an auxiliary steam source 72 connected to a heat exchanger coil 73 in the tank 61 or by any other convenient means.

An aqueous hygroscopic solution of a glycol is circulated by a pump 74 from a reservoir in the contactor 62 through a line 75, an indirect heat exchanger 76 and a line 77 to the regenerator 63 for concentration, while the concentrated solution is circulated by a pump 78 through a line 79, the indirect heat exchanger 76, and a line 80 back to the contactor 62. The glycol solution is also circulated by a pump 81 from the regenerator 63 through a line 82 and a heat exchange coil 83 positioned within the condenser 65 wherein the fluid is heated, and thence through a line 84 and spray nozzles 85 within the regenerator 63. Three-way valves 86 and 87 may also be provided in the lines 82 and 84, respectively, for selectively circulating at least a portion of the fluid through a heat exchange coil 88 in the solar energy storage tank 61 in place of the condenser 65. This enables heating the glycol solution for regeneration directly from the solar energy storage tank when the absorption refrigeration apparatus is not in use. The heated glycol solution is regenerated by air drawn into the regenerator 63 by a blower 89 and through an indirect heat exchanger 90. The air, preferably building exhaust air, travels downwardly on the left side of the regenerator 63 with glycol solution sprayed from the nozzles 85, laterally to the right, and then upwardly through the indirect heat exchanger 90 and the blower 89 to be discharged from the system along with water vaporized from the heated glycol solution. The regenerator 63 can be controlled conveniently by utilizing a by-pass 91, under the control of a valve 92, to maintain the temperature of the glycol solution leaving the nozzles 85 at a predetermined control temperature. It will be noted that the indirect heat exchanger 76 heats the dilute glycol solution flowing from the contactor 62 to the regenerator 63 while simultaneously cooling the concentrated glycol solution flowing from the regenerator 63 to the contactor 62, thereby increasing the efficiency of the dehumidification apparatus.

The glycol solution can be circulated from the contactor 62 by a pump 93 through a three-way valve 94 and a line 95 to a heat exchange coil 96 in an evaporative cooler or cooling tower 97. Cooled glycol solution from the coil 96 can flow through a line 98 and a valve 99, and be sprayed from nozzles 100 within the contactor 62. Either fresh air or a mixture of fresh and return air is drawn into the contactor 62 by a blower 101, and is dehumidified and, usually, cooled sensibly, by contact with the glycol solution being sprayed from the nozzles 100. The contactor 62 can be controlled by using a by-pass 102 under the control of a valve 103, to maintain a predetermined dry bulb temperature at the inlet to the blower 101. Operation of the apparatus of FIG. 3 as described, i.e., using the evaporative cooler 97 to remove heat from the glycol solution, as required, to maintain the predetermined dry bulb temperature at the inlet to the blower 101 is preferred when the outside wet bulb temperature is comparatively low. When the outside wet bulb temperature is higher, the valves 94 and 99 can be set to circulate at least a portion of the glycol solution through a heat exchange coil 104 in the evaporator 66 of the absorption refrigeration apparatus. As is subsequently explained in more detail, this constitutes a particularly advantageous way to operate the apparatus of FIG. 3.

The absorption refrigeration apparatus is of a conventional design. A heat exchange coil 105 in the storage tank 61 is connected to supply heated heat transfer fluid to a heat exchange coil 106 in the generator 64. Heat supplied to the generator 64 evaporates a refrigerant which is carried by a line 107 to the condenser 65. As the refrigerant is liquefied in the condenser 65, heat is liberated. Heat may be absorbed by hygroscopic fluid circulated through the coil 83 to heat such fluid as required for evaporating water vapor from the fluid in the regenerator 63. Any remaining unwanted heat in the condenser 65 may be absorbed by a heat transfer fluid circulated through a heat exchange coil 108 in the condenser 65. The heated heat transfer fluid flows through a line 109 to a heat exchange coil 110 in the evaporative cooler or cooling tower 97 and the cooled fluid is returned through a pump 111 and a line 112 to the coil 108.

The liquefied refrigerant in the condenser 65 passes through a line 113 which includes an expansion valve 114 to the evaporator 66. As refrigerant is vaporized in the evaporator 66, heat is absorbed from heat transfer fluid circulated through the coil 104 and through a heat exchange coil 115. From the evaporator 66, the vaporized refrigerant flows through the absorber and heat exchanger 67, wherein it is again liquefied and returned to the generator 64. The pump 111 also circulates heat transfer fluid through the line 112, a heat exchange coil 116 in the absorber and heat exchanger 67, the line 109 and the heat exchange coil 110 in the evaporative cooler 97 for removing waste heat from the absorber and heat exchanger 67.

On hot sunny days, heat transfer fluid may be circulated through the solar collector 60 at a rate to maintain a temperature of about 200° F. in the solar energy storage tank 61. If refrigerant is heated to substantially 200° F. in the generator 64 by heat transfer from the solar energy storage tank 61, the absorption refrigeration apparatus will cool the evaporator coil 104 to about 55° F. for cooling the glycol solution which dehumidifies air passed through the contactor 62. At the same time, the dilute glycol solution in the regenerator 63 is heated to about 140° F. by circulating a portion of the solution through either the condenser coil 83 or the coil 88 in the solar energy storage tank 61. At these operating temperatures, air leaving the contactor 62 can be cooled to a dry bulb temperature of about 55° F. and dehumidified to a wet bulb temperature of about 30° F.

The conditioned air delivered to an air conditioned space can also be cooled. As previously indicated, the blower 101 draws air through the contactor 62 wherein moisture is removed from the air through contact with the hygroscopic glycol solution. The dehumidified air then flows through a duct 117 to a space, room or building being conditioned. The duct 117 passes through an indirect heat exchanger 118 wherein the dehumidified air may be sensibly cooled to a predetermined temperature. The indirect heat exchanger 118 includes a heat exchange coil 119 which is connected through lines 120 and 121 to a heat exchange coil 122 in the evaporative cooler 97. A pump 123 may be operated to circulate a heat transfer fluid between the coil 119 where heat is absorbed from the dehumidified air and the coil 122 where the absorbed heat energy is dissipated in air and water passed through the cooler 97. The heat exchanger 118 also includes a heat exchange coil 124 through which a chilled heat transfer fluid may be circulated. The coil 124 is connected through lines 125 and 126 to the heat exchange coil 115 in the evaporator 66 of the absorption refrigeration apparatus. Heat transfer fluid which is chilled in the evaporator 66 may be circulated through the coil 124 for cooling air flowing through the duct 117. In addition to the dehumidified fresh air, the duct 117 may be connected to receive return air from a duct 127. The duct 127 passes through a heat exchanger 128 wherein the return air may be cooled, when necessary, prior to mixing with the dehumidified fresh air in the duct 117. The heat exchanger 128 includes a heat exchange coil 129 which is connected through a three-way valve 130 to the line 125 and is connected directly to the line 126 for receiving chilled heat transfer fluid from the coil 115 in the evaporator 66 of the absorption refrigeration apparatus. The return air duct 127 may be connected to mix the return air with the fresh air entering the contactor 62 instead of connecting it to mix the return air with the dehumidified air in the duct 117 (as shown). In this mode of operation, the heat exchanger 128 may be by-passed or the valve 130 may be closed to prevent circulation of a cooled heat exchange fluid through the coil 129 in the heat exchanger 128. After passing through the contactor 62, the dehumidified mixture of return air and fresh air may be cooled sensibly in the heat exchanger 118, if necessary.

Figure 4:
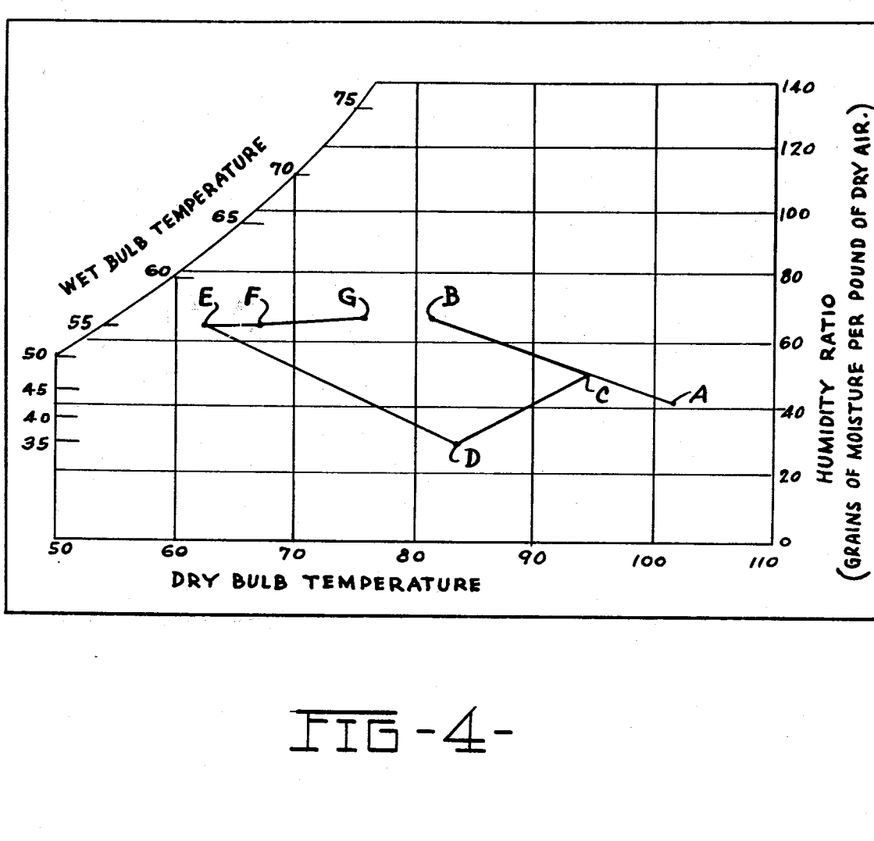
FIG. 4 is a psychometric chart illustrating one way of operating the apparatus of FIG. 3.

The duct 117 carrying dehumidified air from the contactor 62 also may be connected to pass through a humidifier or washer 131. A pump 132 circulates water to a plurality of nozzles 133 which spray a mist of water for humidifying the air delivered to the air conditioned space, and simultaneously adiabatically cooling such air. Turning to FIG. 4, a psychometric chart is shown for a mode of operation in which the air delivered to an air conditioned space is adiabatically cooled by means of the washer 131. FIG. 4 shows the conditioning of outside or fresh air having a dry bulb temperature of 102° F. and a wet bulb temperature of 44° F., point A. This air is mixed with half its weight of return air having a dry bulb temperature of 81° F. and a wet bulb temperature of 56° F., as shown at point B. The mixture results in air having a dry bulb temperature of about 95° F. and a wet bulb temperature of about 48° F., point C. This mixture is delivered to the contactor 62 wherein it is dehumidified and cooled to a dry bulb temperature of 84° F. and a wet bulb temperature of 35° F., point D. The air is then adiabatically cooled in the washer 131 to a dry bulb temperature of 63° F. and a wet bulb temperature of 55° F., as shown at point E. At this point, the air enters the building distribution system in a condition identical to that discussed in reference to FIG. 2. The air will be heated within the distribution system to a dry bulb temperature of 67° F. without changing the wet bulb temperature of 55° F., point F, and under these conditions is delivered to the air conditioned space as required to maintain a dry bulb temperature of 76° F. within the space. It will be noted that the apparatus shown in FIG. 3, operated as described, cools the mixture of outside air and return air to a dry bulb temperature of about 63° F. This is done by dehumidifying to a lower dew point than is required for humidity control, followed by adiabatic washing, and can be accomplished at fairly high contactor temperatures, e.g., temperatures which can be achieved in the coil 96 (FIG. 3) of the evaporative cooler 97 provided that dry ambient air is available as indicated by point A in FIG. 4. However, if available ambient air is relatively humid, for example as illustrated by the point A in FIG. 2, the hygroscopic glycol solution must be circulated through the coil 104 of the evaporator 66 to accomplish this result. The evaporator 66, however, need not provide a particularly low temperature, 70° F. being entirely adequate, and a temperature that can be readily achieved when the condenser 65 is at 140° F., or at a temperature sufficiently high to enable regeneration of the glycol solution.

Figure 5:
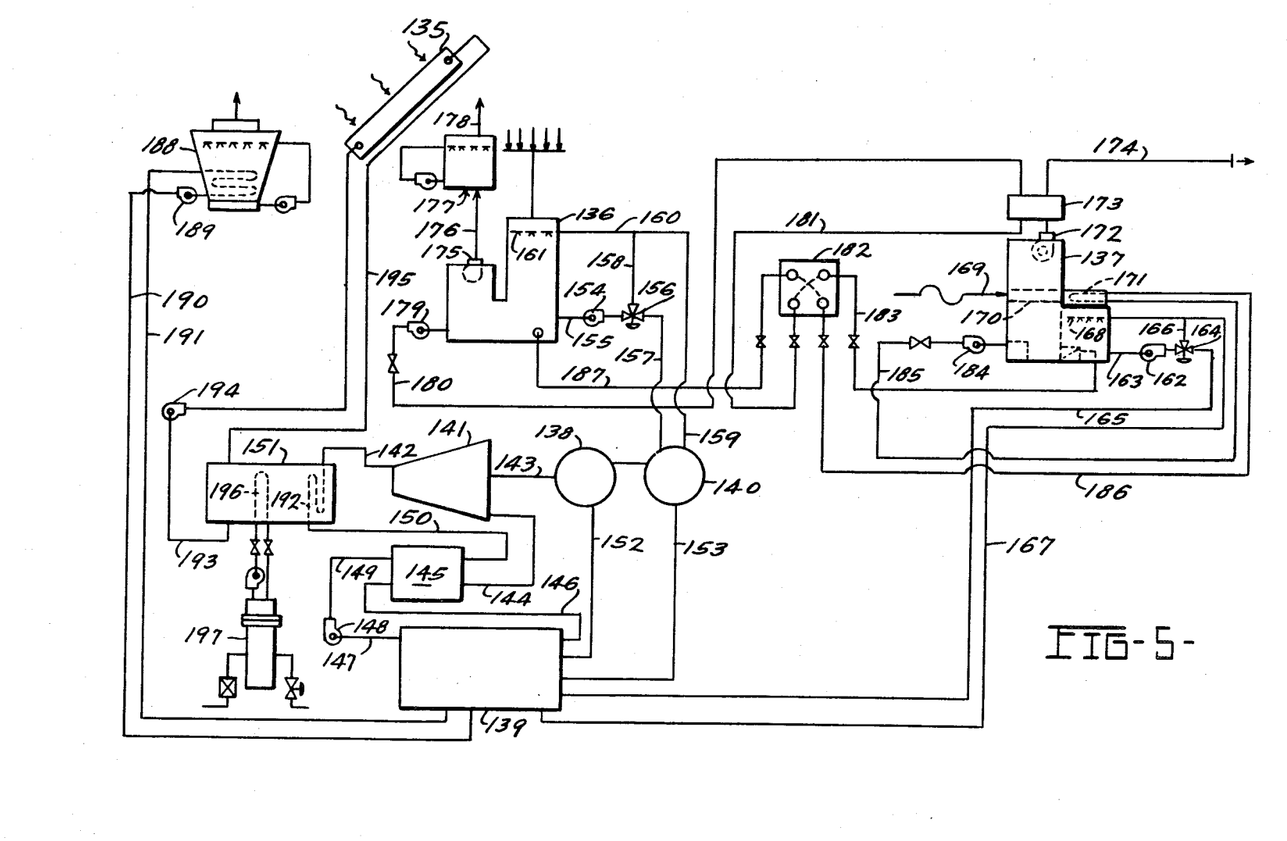
FIG. 5 is a partially schematic diagram of air conditioning apparatus according to the invention, and including a solar collector, an energy storage tank, a chemical dehumidifier and refrigeration apparatus of the compressor-condenser-evaporator type driven by a rankine cycle engine.

Referring, now, to FIG. 5, air conditioning apparatus according to the invention, in another embodiment, comprises a solar collector 135, chemical dehumidification apparatus including a contactor 136 and a regenerator 137 and refrigeration apparatus including a compressor 138, a condenser 139 and an evaporator 140. The compressor 138 of the refrigeration apparatus is driven by an expander 141, which is a part of a rankine cycle engine. A refrigerant such as F-113, is heated, as subsequently described in more detail, by energy from the solar collector 135 and flows through a line 142 to the expander 141 where its expansion drives a turbine (not illustrated) which is operatively connected through a shaft 143 in driving relationship with the compressor 138. Refrigerant flows from the expander 141 through a line 144, a regenerator 145, a line 146, the condenser 139 and a line 147 to a pump 148. Refrigerant flows from the pump 148 through a line 149 back to the opposite side of the regenerator 145 and from thence through a line 150 to a storage tank 151 for water heated in the solar collector 135 or using augmenting heat, as subsequently explained. Refrigerant flow can be controlled so that the temperature entering the expander 141 is about 200° F., while the temperature entering the condenser 139 is about 140° F. Refrigerant is circulated from the condenser 138 through a line 152 to the condenser 139, and, thence, through a line 153 to the evaporator 140, where it can be flashed to a temperature of about 70° F. before being returned to the compressor 138.

A hygroscopic solution of a glycol is circulated by a pump 154 through a line 155 from the contactor 136, and is delivered to a three-way valve 156 which divides the flow between a line 157 and a line 158. The glycol solution flowing in the line 157 is delivered to the evaporator 140 and from there flows through lines 159 and 160 into the contactor 136 to be sprayed from nozzles 161. Glycol solution delivered to the line 158 flows directly to the line 160 and to the nozzles 161. The three-way valve 156 is controlled to maintain a predetermined temperature of the hygroscopic glycol solution sprayed from the nozzles 161.

Heat is transferred from the condenser 139 to a hygroscopic glycol solution which is circulated from the regenerator 137 by a pump 162 through a line 163, and to a three-way valve 164 which divides the flow between a line 165 and a line 166. The hygroscopic glycol solution delivered to the line 165 is circulated to the condenser 139 where it is heated by heat transferred thereto from refrigerant from the compressor 138 and from refrigerant circulated in the solar energy collection system, and is then returned through a line 167 into the regenerator 137, where it is sprayed from nozzles 168. The three-way valve 164 is controlled to divide the flow of hygroscopic glycol solution through the condenser 139, as just described, and through the line 166 to maintain a predetermined temperature of the solution as it is sprayed within the regenerator 137.

Air, preferably relief air from the building served by the apparatus, enters the regenerator 137, as indicated by an arrow 169, passes through an indirect air-to-air heat exchanger 170, and from thence through an indirect air-to-liquid heat exchanger 171 and then downwardly with hygroscopic glycol solution being sprayed from the nozzles 168, laterally to the left and then upwardly through the opposite side of the air-to-air heat exchanger 170 and a blower 172 by which it is discharged from the regenerator 137, through an indirect heat exchanger 173 and then is exhausted through a duct 174. Heat is transferred to the air entering the regenerator 137 (a) from air traveling upwardly through the regenerator 137 to the blower 172 in the indirect heat exchanger 170 and (b) from hygroscopic glycol solution circulated as subsequently described in more detail through the indirect heat exchanger 171. Heat is also transferred from the effluent from the blower 172 in the indirect heat exchanger 173 as subsequently described in more detail. The apparatus can be operated so that air from inside the regenerator 137 entering the indirect heat exchanger 170 is saturated with water vapor and at a dry bulb temperature of 120° F. By indirect heat exchange with the building exhaust air, which can enter the indirect heat exchanger 170 at a dry bulb temperature of about 83° F. and a dew point of about 56° F., the exhaust air entering the blower 171 can be at a dry bulb temperature of 96° F., and have a dew point of 79° F. while, as a consequence of heat transfer in the indirect heat exchanger 173, the exhausted air in the duct 174 can be saturated with water vapor and at a dry bulb temperature of about 75° F.

Air is drawn into the contactor 136 by a blower 175, and flows downwardly therethrough in contact with cooled hygroscopic glycol solution from the nozzles 161, then laterally to the left and upwardly through the blower 175, a line 176, an adiabatic washer indicated generally at 177 and a duct 178 to a space (not illustrated) to be air conditioned.

The apparatus of FIG. 5 also includes an evaporative cooler 188 from which cool water can be circulated by a pump 189 through a line 190 to an auxiliary coil (not illustrated) in the condenser 139. Water is returned from the condenser 139 through a line 191. Water from the cooler 188 is used to maintain a thermal balance whenever there is excess heat in the condenser 139 above that required by the regenerator 137.

The apparatus of FIG. 5 is designed to condition air when the outside dew point is comparatively high, e.g., a dry bulb temperature of 92° F. and a wet bulb temperature of 76° F.: point A, FIG. 2, and to condition that air or, preferably, a mixture of that air with return room air to a lower wet bulb temperature than is required for humidity control in the space, e.g., a dry bulb temperature of 84° F. and a wet bulb temperature of 35° F.: point B, FIG. 4. This air can then be adiabatically washed in the washer 177, distributed throughout the building, and used as required to maintain temperature and humidity.

As has been stated above, a refrigerant that has been heated by energy from the solar collector 135 (FIG. 5) flows through a line 142 to the expander 141. Refrigerant in the line 142 has been heated as it flowed through a liquid-to-liquid indirect heat exchanger 192 in the heated water storage tank 151. When solar energy is available, that energy is intercepted by the solar collector 135 and transferred to water circulated from the storage tank 151 through a line 193 by a pump 194. Heated water returns to the storage tank 151 from the solar collector 135 through a line 195. The apparatus also includes an indirect liquid-to-liquid heat exchanger 196 within the storage tank 151. Whenever required heat from the solar collector 135 can be supplemented, or replaced, by heat from an auxiliary steam source 197 connected to the indirect heat exchanger 196.

Figure 6:
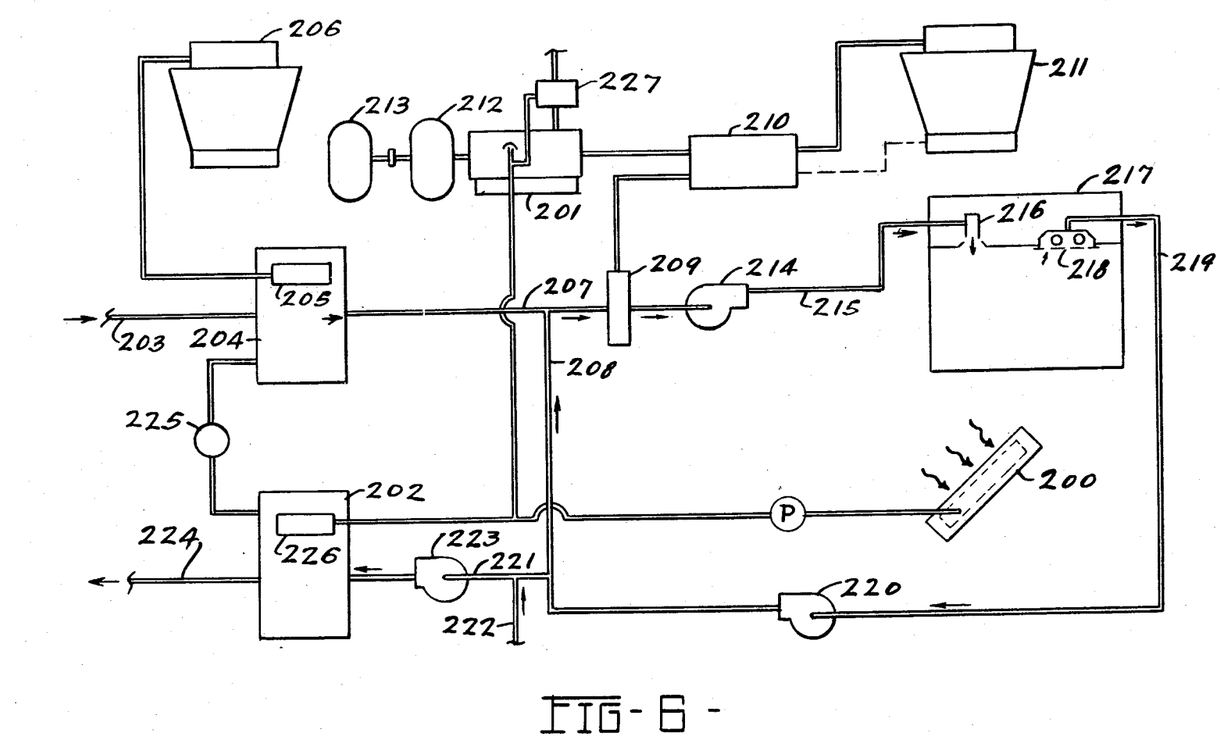
FIG. 6 is a schematic diagram of air conditioning apparatus according to the present invention in which a desiccant from a chemical dehumidifier is regenerated with both solar energy and waste energy from a diesel engine which drives an air conditioner compressor.

Referring to FIG. 6, a heating, ventilating and air conditioning system is shown in which thermal energy from a solar collector 200 is augmented with waste heat from a diesel engine 201 for regenerating a desiccant such as a glycol solution in a regenerator 202. Outside air passes from an air intake 203 through a chemical dehumidifier 204 which may, for example, be the same as the contactor 12 shown in FIG. 1. Within the dehumidifier 204, moisture is removed from the fresh outside air. At the same time, heat of sorption is transferred through a coil 205 to a cooling tower 206 and thence transferred to the atmosphere. From the dehumidifier 204, the dehumidified air passes through a duct 207 along with return air from a duct 208 to a cooling coil 209. Heat transfer fluid is circulated from the cooling coil 209 to refrigeration apparatus 210. The refrigeration apparatus 210 transfers heat from the cooling coil 209 to a cooling tower 211 in a conventional manner. The refrigeration apparatus 210 is driven by the diesel engine 201. The diesel engine 201 may also be connected to drive an electric generator 212 and an emergency power generator 213, when desired.

The dehumidified and chilled air discharged from the cooling coil 209 passes through a blower 214 and a duct 215 and is then discharged through defusers 216 located in the ceiling of an air conditioned space 217. Building exhaust air and return air from the space 217 is drawn through a lighting fixture 218 into a duct 219 by return air fan 220. As the return air passes through the lighting fixture 218, waste thermal energy is removed from such lighting fixture 219. As much as 50 percent or more of the lighting fixture thermal load may be removed from the space 217 by exhausting the return air through the lighting fixture 218. This in turn decreases the quantity of air needed to be supplied to the space 217 to maintain a desired space temperature.

The return air withdrawn from the space 217 through the lighting fixtures 218 will be at an appreciably higher temperature than the normal temperature of the conditioned space 217. For example, if the space 217 is maintained at 75° F., the return air may be on the order of 87° F. A portion of the return air is exhausted from the building through the regenerator 202. The duct 208 is connected to a duct 221 in which a portion of the return air is mixed with outside air, as needed, from a duct 222. A blower 223 forces air from the duct 221 through the regenerator 202 and exhausts the moisture laden air through a building exhaust duct 224. A pump 225 is connected to circulate a dilute glycol solution from the contactor 204 to the regenerator 202 and to return concentrated glycol solution from the regenerator 202 to the contactor 204. The glycol solution within the regenerator 202 is heated by a coil 226 through which a hot heat transfer solution is circulated. The heat transfer solution is circulated to receive solar energy from the solar collector 200 and also to receive thermal energy from a coil 227 located in the exhaust stach for the diesel engine 201. Through the use of solar energy from the solar collector 200 and exhaust energy from the coil 227 in the diesel engine exhaust stack, sufficient heat is available for maintaining the desiccant within the regenerator 202 at 200° F.

Figure 7:
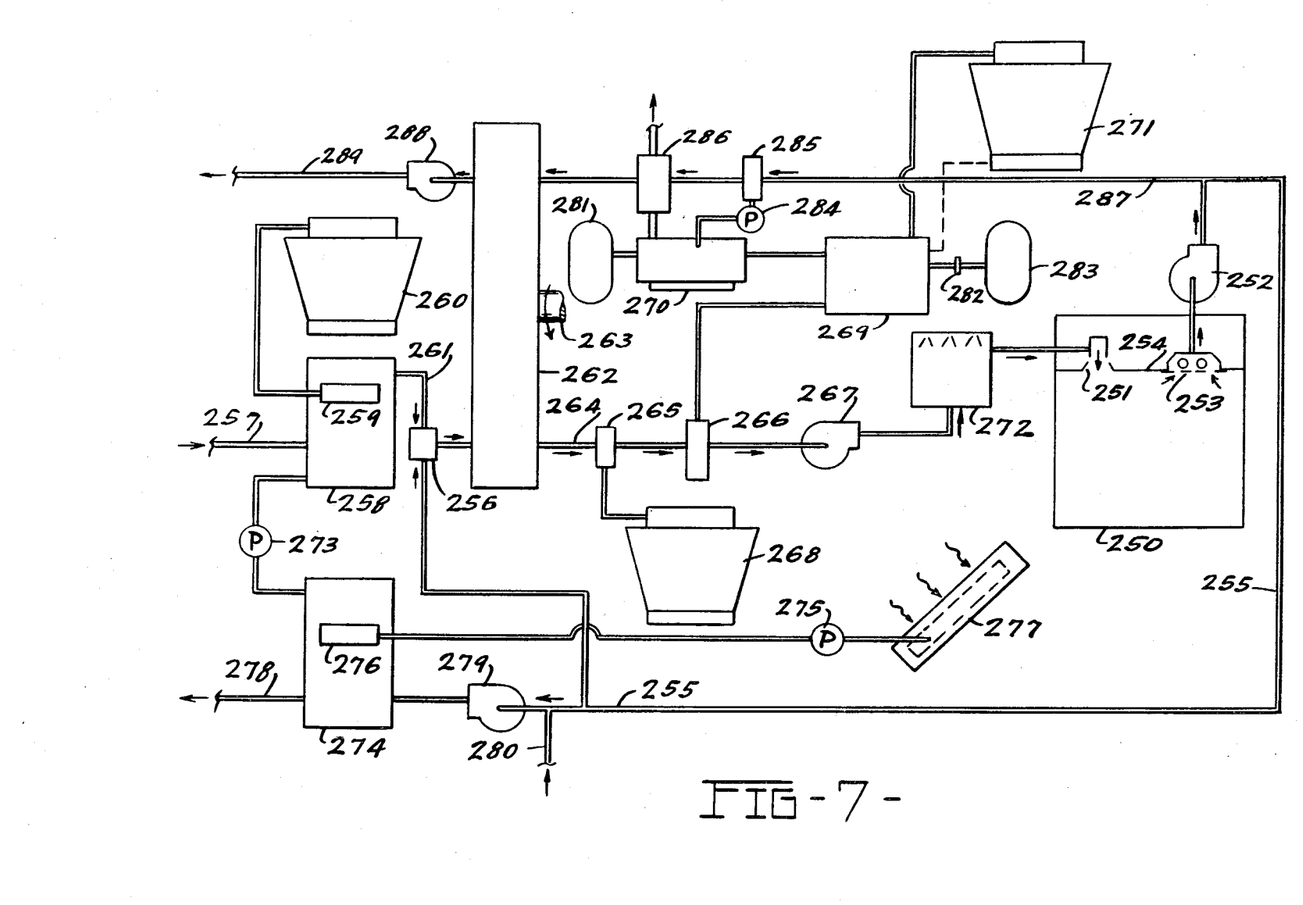
FIG. 7 is a schematic diagram of air conditioning apparatus according to the present invention in which a liquid desiccant in a first dehumidification stage is regenerated with solar energy and a dry desiccant in a second dehumidification stage is regenerated with waste heat from a diesel engine which drives an air conditioner compressor.

Referring now to FIG. 7, still a further modified embodiment is shown of apparatus for conditioning air within a space 250. The apparatus generally uses two stages of dehumidification, refrigeration apparatus driven from a diesel engine and an evaporative cooler for cooling air supplied through a ceiling diffuser 251 to the space 250. A combination of solar energy and waste heat from the diesel engine which drives the refrigeration apparatus is used for regenerating desiccant for the two stages of dehumidification.

A blower 252 is connected to withdraw air from the space 250 through lighting fixtures 253 located within a ceiling 254 for the conditioned space 250. As air is withdrawn through the lighting fixtures 253, a portion of the heat produced by the lighting fixtures 253 is withdrawn from the space 250, thereby reducing the quantity of air needed to be supplied through the diffuser 251 to cool the space 250 to a desired temperature. A portion of the air withdrawn from the space 250 by the blower 252 is circulated through a duct 255 to a mixing valve or chamber 256. Fresh air which is to be added to the conditioned space 250 enters the apparatus through a duct 257. Fresh air entering through the duct 257 passes through a contactor or chemical dehumidifier 258 wherein it contacts a spray of a liquid chemical desiccant, such as a glycol solution. As such fresh air is dehumidified through contact with the desiccant, heat of sorption is generated. A heat transfer fluid circulated between a coil or indirect heat exchanger 259 and a cooling tower 260 removes the heat of sorption from the dehumidified fresh air. The dehumidified fresh air leaves the dehumidifier 258 through a duct 261 which connects with the mixing valve or chamber 256 wherein it mixes with recirculated air from the space 250. From the mixing valve 256, the fresh air/recirculated air mixture passes through a dehumidifier 262. The dehumidifier 262 is in the form of a rotating wheel having a crystalline desiccant, such as silica gel, located within a porous honeycomb structure. As the dehumidifier 262 is rotated about an axis 263, the air mixture passing through the dehumidifier 262 is exposed to regenerated desiccant crystals for removing moisture from such air mixture. From the dehumidifier 262, the air passes into a duct 264 which is connected through a first indirect heat exchanger coil 265 and a second indirect exchange coil 266 to a fan or blower 267. The first indirect heat exchange coil 265 is connected to a cooling tower 268 for removing heat of sorption from the dehumidified air mixture leaving the dehumidifier 262 and dissipating such heat of sorption to the atmosphere. The second indirect heat exchange coil 266 is cooled by refrigeration apparatus 269. A diesel engine 270 drives the refrigeration apparatus 269 for transferring heat from the second coil 266 to a cooling tower 271. The blower 267 circulates the cooled air from the second coil 266 through an evaporative cooler 272 to the diffuser 251 located within the ceiling structure 254 over the conditioned space 250. Within the evaporative cooler 272, moisture is evaporated into the air to decrease the temperature of such air. Through the use of the dehumidifiers 258 and 262, the moisture content or wet bulb temperature of the air entering the evaporative cooler 272 is low. Therefore, considerable cooling is achieved through water evaporation. Air supplied from the evaporative cooler 272 to the space 250 may, for example, have a temperature on the order of 40° F. This low temperature is achieved through the use of a minimum load on the refrigeration apparatus 269.

The liquid desiccant which dehumidifies fresh air within the dehumidifier 258 is regenerated through the use of solar energy. A pump 273 circulates dilute desiccant from the dehumidifier 258 to a regenerator 274 and returns a concentrated desiccant from the regenerator 274 back to the dehumidifier 258. A pump 275 circulates a heat transfer fluid between a coil 276 within the regenerator 274 and a solar energy collector 277. The heat transfer fluid is heated to a predetermined high temperature, such as approximately 200° F., within the solar collector 277. The heated heat transfer fluid is then circulated from the solar collector 277 to the coil 276 where such heat is transferred to the dilute hygroscopic solution during regeneration. After the dilute solution is heated, it is contacted with air which picks up moisture from the dilute solution and then the hot moist air is discharged through a duct 278 to the atmosphere. To increase the efficiency of the system, at least a portion of the air supplied to the regenerator 274 is in the form of exhaust air from the conditioned space 250. The return air duct 255 is connected through a blower 279 to supply building exhaust air to the regenerator 274. Fresh outside air, as needed, is also supplied from a duct 280 through the blower 279 through the regenerator 274. Since the relative humidity of air within the conditioned space 250 is relatively low, the efficiency of moisture transfer from the dilute hygroscopic solution to the air discharged through the regenerator 274 is increased over systems using only outside for regenerating a desiccant. The diesel engine 270 is connected to drive the refrigeration apparatus 269 and also to drive auxiliary electric generator 281. The output from the electric generator 281 may be used, for example, for driving the various pumps, blowers and fans within the system for conditioning air within the building space 250. In addition, it may be used for any other desired purpose. If the environmental control system shown in FIG. 7 is used for conditioning air within a hospital, the diesel engine may also be connected through a clutch 282 for driving an emergency electric generator 283 during a failure of the commercial power source used for operating lighting and equipment in such hospital. Waste heat is a by-product from operation of the diesel engine 270. A pump 284 circulates a heat transfer fluid, such as water, through passages around cylinders within the internal combustion engine 270 for cooling such cylinders. The pump 284 circulates such water from the engine 270 to an indirect fluid-to-air heat exchange coil 285. Exhaust gases also carry waste heat from the engine 270. The exhaust gases pass through an indirect air-to-air heat exchanger 286 for recovering waste heat from such exhaust gases.

The granular desiccant within the dehumidifier 262 is regenerated with exhaust air from the building space 250 along with the regeneration of liquid desiccant within the regenerator 274. A portion of the air withdrawn from the space 250 by the blower 252 flows from the blower 252 into a duct 287. The duct 287 is connected sequentially through the heat exchanger 285 and the heat exchanger 286. The hot water circulated through the heat exchanger 285 may, for example, heat the air in the duct 287 to approximately 200° F. The hot exhaust gases passing through the heat exchanger 286 further heats this air to approximately 300° F. The 300° F. air leaving the heat exchanger 286 in the duct 287 is circulated through the dehumidifier 262 to regenerate the desiccant therein. The hot air within the duct 287 is circulated through a portion of the desiccant within the dehumidifier 262 as the wheel containing the desiccant rotates. The portion of the hot air circulated through the desiccant for regeneration is spaced from the portion of the regenerated desiccant contacted by air circulated through the duct 264 for delivery to the conditioned space 250. A blower or fan 288 withdraws the moisture-laden hot air from the dehumidifier 262 and discharges such air through a duct 289 to the atmosphere outside the building containing the conditioned space 250.

The systems of FIGS. 6 and 7 represent considerable increase in energy efficiency over a conventional system in which chilled fresh air is mixed with recirculated air for conditioning spaces within a building. The efficiencies are also increased over prior art solar systems because there is not a total reliance on the availability of solar energy. Furthermore, both the waste heat from the diesel engine and solar energy are available for winter heating.

In the embodiment shown in both FIGS. 6 and 7, a diesel engine was operated to drive refrigeration apparatus and to drive generators which serve as a source of electricity for powering the system. The diesel engine also produces waste heat which is used for regeneration of a desiccant within a chemical dehumidifier. In still another embodiment of the invention, the diesel engine can be replaced with a bank of fuel-cells. A fuel-cell directly converts a fuel and an oxidant into an electric current and, as a by-product, also produces heat. The heat level depends upon the construction of the fuel-cell and various other factors such as the nature of the fuel and the oxidant used within the fuel-cell. Various fuel-cells operate anywhere from relatively low temperatures, below 200° C., up to very high temperatures, above 900° C. A bank of fuel-cells may be used to replace the diesel engine and the electric generators within the systems of either FIG. 6 or FIG. 7. The fuel-cell generates electricity which operates the various fans, blowers and pumps within the system and, when necessary, also drives electrically powered refrigeration apparatus. Waste heat from the fuel-cell is transferred to air circulated through a desiccant regenerator or through a granular or solid desiccant for removing moisture from such desiccant. The hot, moisture-laden air is then discharged to the atmosphere.

Although only preferred embodiments of the invention have been described above, it will be appreciated that various changes and modifications can be made without departing from the spirit and the scope of the following claims. It should also be appreciated that the above-described apparatus may be operated in different modes to meet seasonally changing requirements. For example, during winter operation, the dehumidifier can be reversed for humidifying fresh air supplied to a space. A heated dilute hygroscopic glycol solution, or even water, can be sprayed in the contactor 12 (FIG. 1) for humidifying air circulated through the contactor. When solar energy is available, the solar energy collector is used for heating such solution. The temperature of the solution and the rate at which it is sprayed from the contactor nozzles is controlled to give a desired wet bulb temperature at the outlet from the contactor. The humidified air can then be heated, as necessary, to maintain a desired temperature in the space being air conditioned. Also, at least one air-to-liquid heat exchanger analogous to the exchanger 171, to the exchanger 173, or to both (FIG. 5) can be used in a similar manner in the apparatus of FIG. 1 or in the apparatus of FIG. 3.

The embodiments of the invention in which an exclusive property or privilege is claimed are defined as follows:

1. Apparatus for conditioning air comprising, in combination, a dehumidifier, means for circulating air to be conditioned thrugh said dehumidifier in contact with a regenerated hygroscopic material whereby the air is dehumidified and, as a consequence, there is heat of sorption, a regenerator for the hygroscopic material, means for circulating air to and through said regenerator in contact with hygroscopic material therein and then from said regenerator, means for effecting indirect heat transfer between air circulated to said regenerator and air circulated therefrom, a solar collector, means for transferring heat from said solar collector to regenerate hygroscopic material in said regenerator whereby moisture from the spent hygroscopic material is removed by the air circulated in contact therewith, and means for transferring the heat of sorption to a heat sink.

2. Apparatus for conditioning air comprising, in combination, a dehumidifier, means for circulating air to be conditioned through said dehumidifier in contact with a regenerated hygroscopic material whereby the air is dehumidified and, as a consequence, there is heat of sorption, a regenerator for the hygroscopic material, means for circulating air through said regenerator in contact with hygroscopic material therein, a solar collector, and means for transferring heat of sorption and heat from said solar collector to the hygroscopic material in said regenerator, said last-named means including a thermally energized refrigeration unit operatively associated with said solar collector to receive energizing heat transferred therefrom, said refrigeration unit including an evaporator and a condenser, said evaporator being operatively associated to receive heat of sorption and to transfer such heat to said condenser and said condenser being operatively associated to receive heat of sorption from said evaporator and energizing heat transferred from said solar collector to said refrigeration unit and to transfer such heat to hygroscopic material in said regenerator, whereby moisture is removed from the hygroscopic material by the air circulated in contact therewith.

3. Apparatus for conditioning air, as set forth in claim 2, wherein said thermally energized refrigeration unit is absorption refrigeration apparatus.

4. Apparatus for conditioning air, as set forth in claim 2, wherein said thermally energized refrigeration unit is rankine cycle refrigeration apparatus.

5. Apparatus for conditioning air comprising, in combination, a dehumidifier, means for circulating air to be conditioned through said dehumidifier in contact with a regenerated hygroscopic material whereby the air is dehumidified and, as a consequence, there is heat of sorption, a regenerator for the hygroscopic material, means for circulating air through said regenerator in contact with hygroscopic material therein, a solar collector, and means for transferring heat of sorption and heat from the solar collector to the hygroscopic material in said regenerator, said last-named means including a thermally energized refrigeration unit having a energy input section operatively associated with said solar collector to receive energizing heat therefrom, said refrigeration unit also including a heat absorbing section and a heat rejection section, said heat absorbing section being operatively associated to receive heat of sorption and to transfer such heat to said heat rejecting section and said heat rejecting section being operatively associated to receive heat of sorption from said heat absorbing section and energizing heat transferred from said solar collector to said refrigeration unit and to transfer such heat as regenerating heat to hygroscopic material in said regenerator whereby moisture is removed from the hygroscopic material by the air circulated in contact therewith.

6. Apparatus for conditioning air comprising, in combination, a dehumidifier, means for circulating air to be conditioned through said dehumidifier, refrigeration means for transferring heat from dehumidified air circulated through said dehumidifier, power means for driving said refrigeration means, said power means producing waste heat, a regenerator, means for circulating air through said regenerator, means for circulating a concentrated aqueous hygroscopic solution from said regenerator through said dehumidifier whereby the air is dehumidified and, as a consequence, there is heat of sorption, means for circulating a dilute aqueous hygroscopic solution from said dehumidifier to said regenerator and into direct contact with air circulated therethrough, means for removing heat of sorption from air circulated through said dehumidifier, a solar energy collector, and means for transferring heat to the hygroscopic solution in said regenerator including means for transferring heat from said solar energy collector to the hygroscopic solution, and means for transferring waste heat from said power means to the hygroscopic solution.

7. Apparatus for conditioning air, as set forth in claim 6, wherein said means for transferring heat to the dilute hygroscopic solution further includes means for transferring such heat of sorption removed from air circulated through said dehumidifier to the dilute hygroscopic solution.

8. Apparatus for conditioning air, as set forth in claim 6, including a second dehumidifier having a desiccant therein, means for circulating dehumidified air through said second dehumidifier for further dehumidification before heat is transferred therefrom to said refrigeration means.

9. Apparatus for conditioning air, as set forth in claim 8, and further including means for spraying the air effluent from said second dehumidifier with water to lower the dry bulb temperature.

10. Apparatus for conditioning air comprising, in combination, a contactor, means for circulating air to be conditioned to said contactor in contact with a regenerated hygroscopic material, a regenerator for the hygroscopic material, means for circulating air to and through said regenerator in contact with hygroscopic material therein and then from said regenerator, an absorption refrigerator including a generator and an evaporator, a solar collector, means for transferring heat from said solar collector to said generator and to regenerate hygroscopic material in said regenerator whereby moisture from the spent hygroscopic material is removed by air circulated in contact therewith, and means for transferring heat of sorption developed in said contactor to the evaporator of said absorption refrigerator, and from thence to a heat sink.

11. Apparatus for conditioning air, as set forth in claim 10, and including a heat exchanger disposed in the path of the effluent air leaving said contactor, and means for transferring heat from said heat exchanger to said evaporator whereby air leaving said contactor is cooled to a predetermined temperature.

12. Apparatus for conditioning air, as set forth in claim 11, and further including means for spraying the air effluent from said contactor with water to lower the dry bulb temperature of such air.

13. Apparatus for conditioning air, as set forth in claim 10, and further including means for effecting indirect heat transfer between air circulated to said regenerator and air circulated therefrom.

14. Apparatus for conditioning air comprising, in combination, a dehumidifier, means for circulating air to be conditioned through said dehumidifier in contact with a regenerated hygroscopic material whereby the air is dehumidified and, as a consequence, there is heat of sorption, a regenerator for the hygroscopic material, means for circulating air through said regenerator in contact wih hygroscopic material therein, a solar collector, means for transferring heat of sorption and heat from said solar collector to the hygroscopic material in said regenerator, said last-named means including a thermally energized refrigeration unit operatively associated with said solar collector to receive energizing heat transferred therefrom, said refrigeration unit including an evaporator and a condenser, said evaporator being operatively associated to receive heat of sorption and to transfer such heat to said condenser and said condenser being operatively associated to receive heat of sorption from said evaporator and energizing heat transferred from said solar collector to said refrigeration unit and to transfer such heat to hygroscopic material in said regenerator, whereby moisture is removed from the hygroscopic material by the air circulated in contact therewith, refrigeration means including an evaporator and a condenser, said evaporator being operatively associated to receive heat of sorption generated as a consequence of the dehumidification of air in said dehumidifier, and said refrigeration means being operable to reject such heat to a heat sink, means operable to drive said refrigeration apparatus and to generate heat, and means operatively associated to transfer heat generated by said last-named means into regenerating relationship with hygroscopic material in said regenerator and into energizing relationship with said refrigeration unit.

15. Apparatus for conditioning air, as set forth in claim 14, wherein said thermally energized refrigeration unit is absorption refrigeration apparatus.

16. Apparatus for conditioning air, as set forth in claim 14, wherein said thermally energized refrigeration unit is rankine cycle refrigeration apparatus.

17. Apparatus for conditioning air comprising, in combination, a dehumidifier, means for circulating air to be conditioned through said dehumidifier in contact with a regenerated hygroscopic material whereby the air is dehumidified and, as a consequence, there is heat of sorption, a regenerator for the hygroscopic material, means for circulating air through said regenerator in contact with hygroscopic material, a solar collector, means for transferring heat of sorption and heat from said solar collector to the hygroscopic material in said regenerator, said last-named means including refrigeration apparatus having an evaporator and a condenser, said evaporator being operatively associated to receive heat of sorption and to transfer such heat to said condenser and said condenser being operatively associated to receive heat of sorption from said evaporator and to transfer such heat into regenerating relationship with hygroscopic material in said regenerator, means operable to drive said refrigeration apparatus and to generate heat, and means operatively associated to transfer heat generated by said last-named means into regenerating relationship with hygroscopic material in said regenerator, whereby moisture from the spent hygroscopic material is removed by the air circulated in contact therewith.

* * * * *